W. H. WRIGHT.
CAR-AXLE LUBRICATOR.

No. 180,980. Patented Aug. 8, 1876.

Witnesses: William H. Wright
Inventor.

UNITED STATES PATENT OFFICE.

WILLIAM H. WRIGHT, OF NORTH TARRYTOWN, NEW YORK.

IMPROVEMENT IN CAR-AXLE LUBRICATORS.

Specification forming part of Letters Patent No. 180,980, dated August 8, 1876; application filed June 12, 1876.

*To all whom it may concern:*

Be it known that I, WILLIAM H. WRIGHT, of North Tarrytown, Westchester county, State of New York, have invented certain Improvements in Lubricators for Car-Axle Journals; and I do hereby declare that the following is a description thereof, reference being had to the accompanying drawings, forming a part of this specification, in which—

Figure 1:
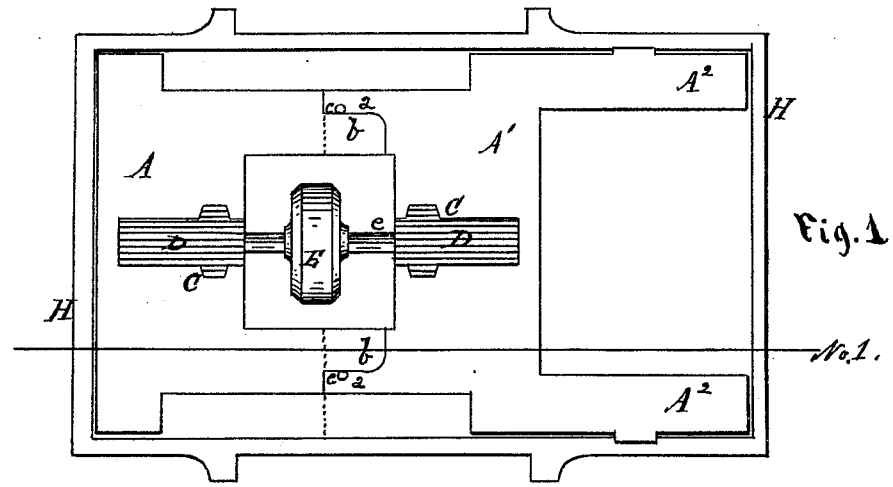
Figure 2:
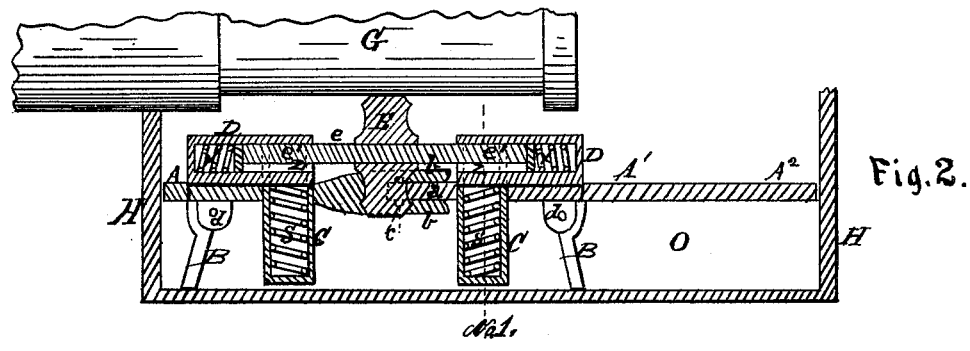
Figure 3:
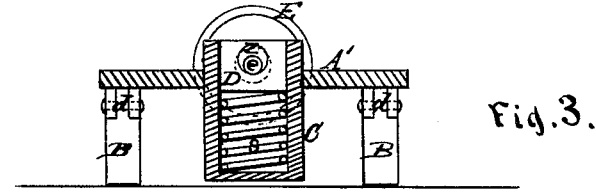
Figure 4:

Figure 1 represents a plan view of the device embodying the improvements in this invention. Fig. 2 is a sectional elevation of the same. Fig. 3 is a cross-sectional view of the same, taken at line No. 1 in Fig. 2. Fig. 4 is a longitudinal sectional elevation of frame, taken at line No. 1 in Fig. 1.

My invention relates to that class of lubricators known as rotating or revolving wheel lubricators, in which a wheel revolving in the oil below transfers the same to the axle above; and consists in the combinations of devices hereinafter described.

The object of this invention is to maintain the oiling wheel or roller about centrally of the length of the journal, and to facilitate the adjustment of the lubricator within the box or housing without necessitating any alteration of the same, and also to prevent the oil from swashing out of the box.

To enable others skilled in the art to make and use my invention, I will proceed to describe it, with reference to the drawings and letters of reference marked thereon, the same letters indicating like parts.

In the drawings, A and $A^1$ represent the sectional platform, employed for holding the operating parts of the device, and also for preventing the swash of the oil in the oil-chamber, and at the same time it permits of a ready insertion and adjustment of the device within the oil-chamber without necessitating any alteration or change of the construction of the housing H. One of the sections, $A^1$, is attached to the other section, A, by means of tongues *a a* entering between the lips *b b*, as shown in Figs. 1, 2, and 4.

*c c* are guide-pins, to hold the sections from shifting one with another. Extension-arms $A^2$ $A^2$ are also made with said platform, to reach forward and bear against the inner surface of the end wall of the housing, as shown in Figs. 1 and 2, to prevent the device from shifting endwise. The said platform is supported by legs B B, which are connected to the same by pivot-joints *d d*, so as to be capable of folding up.

Made with the sections A $A^1$ of the platform are the ways C C, Figs. 2 and 3, in which work the bearings D D, which bearings are supported by the spiral springs *s s*. E is the oiling wheel or roller fitted to shaft *e*, the ends *e' e'* of said shaft working in bearings D, which are made smaller than the diameter of the bore of the bearings D D, so as to allow a considerable play in a lateral direction every way. The ends of shaft *e* are supported in a horizontal manner by springs *x x* bearing against them from the ends of the bearings D, as shown in Fig. 2, that the said shaft and its attached oiling-wheel E may be preserved centrally between the said bearings and the ends of the axle-journal, and be permitted to have an elastic end play in either direction when the axle G has had given to it a horizontal end movement, which is incidental with all car-axles when running.

To place this device in proper position within the oil-chamber O, the legs B of section A are to be folded up against the lower side of said section, as it is being placed within the housing H. When within and shoved back, the said legs are to be thrown down, as in Fig. 2. One end of the oiling-wheel shaft *e* is then inserted in its bearing D in section A, and the section $A^1$ is then inserted, with its legs B folded up, and the opposite end of shaft *e* is to be guided into its bearing D in the section $A^1$, and the tongues *a a* are guided between lips *b b*. When thus placed in its several parts, the platform is to have its forward end raised by throwing down legs B, as shown in Fig. 2, when the oiling-wheel E will be thrown up against the lower surface of journal G, and be in position about centrally of its length.

I am aware that oiling wheels or rollers, revolved by the journal of a car-axle, and carrying oil from a chamber below to the lower surface of the journal above is old. This I do not claim; neither do I claim the feature of an end play to the shaft of the oiling-wheel, as it is well known.

Having described my invention, what I claim, and desire to secure by Letters Patent, is—

1. The sectional platform A A¹, the parts being capable of separate insertion in the housing H, and therein joined together, and adapted for supporting the operating parts of a wheel or roller lubricator, substantially as and for the purpose set forth.

2. The combination, with a platform provided with vertical ways C and bearings D, having elastic vertical supporting-springs $s\ s$, of the oiling roller or wheel E attached to shaft $e$, having elastic end bearing-springs $z\ z$, substantially as and for the purpose set forth.

3. The combination, with the sectional platform A A¹, capable of being separated in its parts, and joined together within the housing H, of the pivoted legs B B capable of being folded up against the lower sides of the section of said platform, and being thrown down to support the same, substantially as and for the purpose set forth.

WILLIAM H. WRIGHT.

Witnesses:
CHAS. J. SELKIRK,
LEWIS CARNER.